June 11, 1963 J. S. COLLMAN ET AL 3,093,009
GAS TURBINE REGENERATOR DRIVE
Original Filed Sept. 10, 1958 4 Sheets-Sheet 1

INVENTORS
John S. Collman,
James M. Ricketts &
BY William Q. Turunen

Paul Fitzpatrick
ATTORNEY

June 11, 1963  J. S. COLLMAN ET AL  3,093,009
GAS TURBINE REGENERATOR DRIVE
Original Filed Sept. 10, 1958  4 Sheets-Sheet 2

INVENTORS
John S. Collman,
James M. Ricketts &
BY William A. Turunen

Paul Fitzpatrick
ATTORNEY

INVENTORS
John S. Collman,
James M. Ricketts &
BY William A. Turunen.

Paul Fitzpatrick
ATTORNEY

United States Patent Office 3,093,009
Patented June 11, 1963

3,093,009
GAS TURBINE REGENERATOR DRIVE
John S. Collman, Detroit, James M. Ricketts, Oxford, and William A. Turunen, Birmingham, Mich., assignors to General Motors Corporation, Detroit, Mich., a corporation of Delaware
Original application Sept. 10, 1958, Ser. No. 760,211. Divided and this application Sept. 29, 1960, Ser. No. 59,222
2 Claims. (Cl. 74—410)

This application is a division of Serial No. 760,211, filed September 10, 1958, now Patent No. 3,077,074.

Our invention relates to a regenerative gas turbine engine particularly suited for automotive and similar applications. It is incorporated in an improvement upon or development of an engine of generally similar configuration which is disclosed in U.S. Patent applications Serial Nos. 559,176, now Patent No. 2,960,306, 559,389, now Patent No. 2,937,010, 559,390, now Patent No. 3,057,604, and 559,475, now abandoned, filed January 16, 1956, all of common ownership with this application. The invention relates to improved driving means for the regenerator matrices, as will be clear to those skilled in the art from the succeeding detailed description of the preferred embodiment thereof and the accompanying drawings.

GENERAL DESCRIPTION

Figure 1:
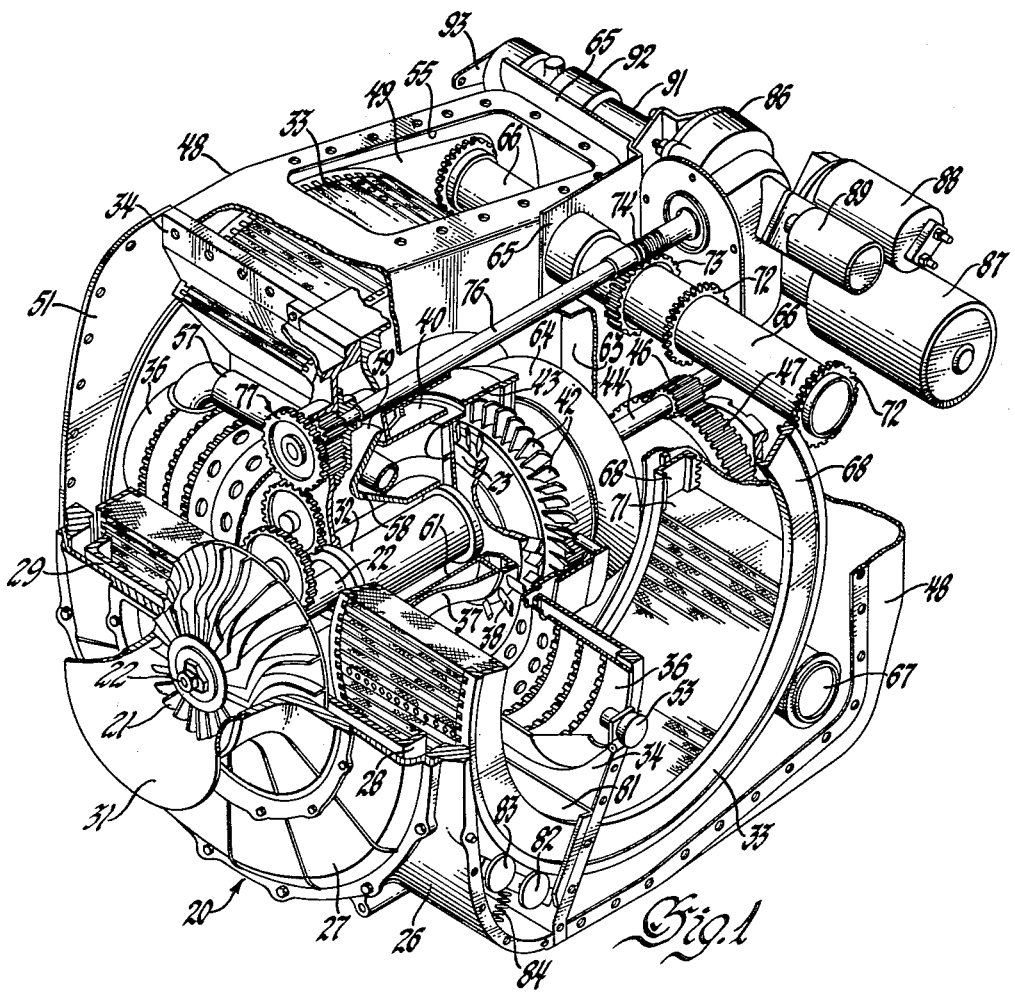
FIG. 1 is an axonometric view of the preferred embodiment of the engine, with parts cut away, and somewhat simplified.
Figure 2:
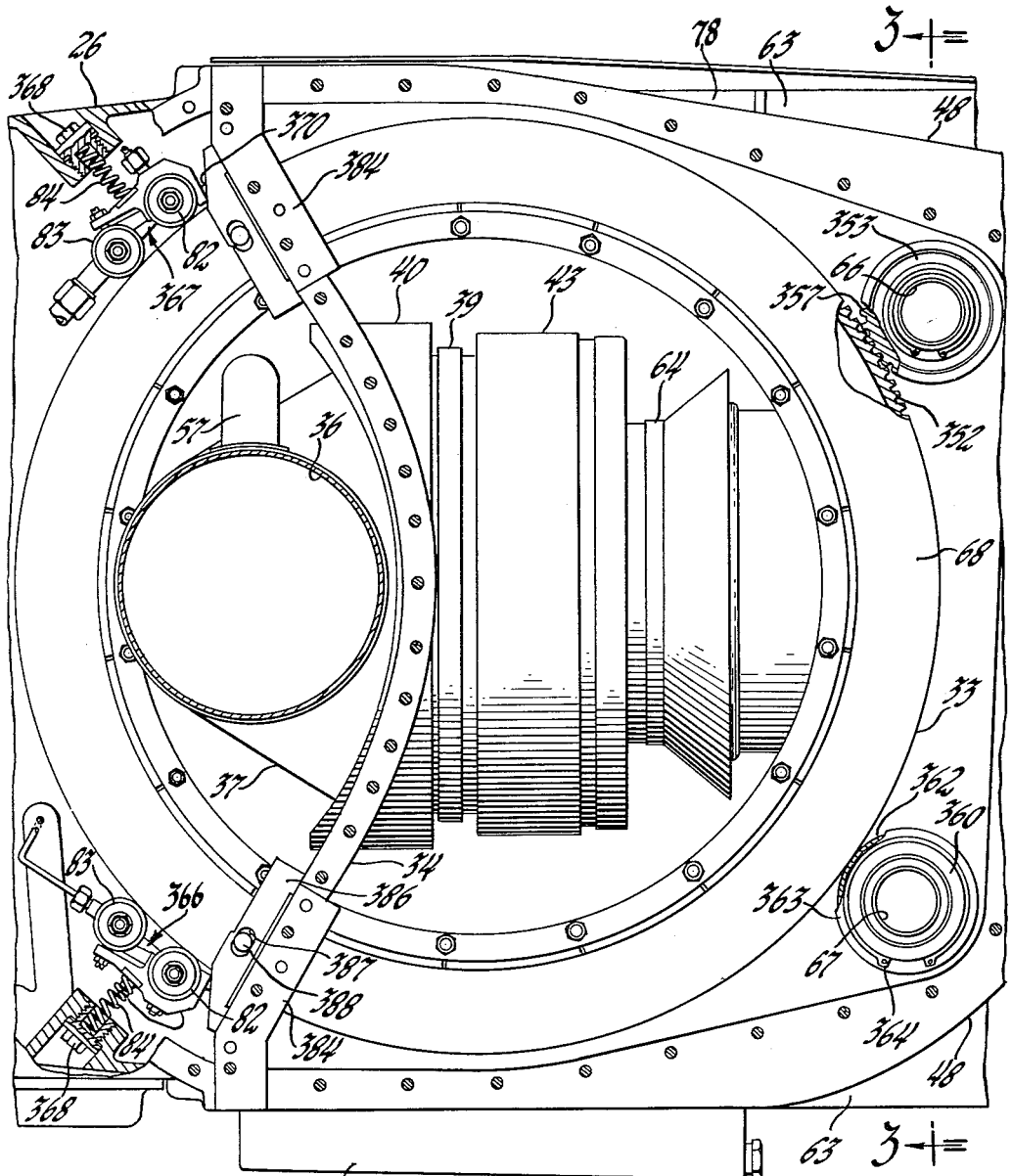
FIG. 2 is a side elevation view of the central portion of the engine with parts cut away and in section.

By way of introduction to the engine, its general structure will be outlined briefly with reference to FIGS. 1 and 2. The engine comprises a compressor 20 including a rotor 21 mounted on a shaft 22 on which also is mounted the rotor wheel 23 of a first or compressor turbine. The stator of the compressor comprises the rear case 26 and a front cover assembly 27. A generally annular outlet 28 for the compressor is defined between outer and inner portions of the rear case 26. The compressor diffuser 29 lies between the front cover and rear case. A suitable air inlet 31 may be provided. The compressor rear case is part of a unitary structure which may be termed the forward frame or compressor turbine housing, and which includes a shaft housing 32 within which shaft 22 is supported.

Two regenerator matrix drums 33 are mounted for rotation about a horizontal axis intersecting the axis of shaft 22. Each matrix passes at two points through a bulkhead 34 which comprises an arcuate plate of generally rectangular outline bolted at its upper and lower edges to the compressor rear case portion 26 of the forward frame. Two flame tubes or combustion liners 36 are mounted in the space between the matrix and the bulkhead at the forward side of the bulkhead. These discharge through transition sections 37 into a first or power turbine nozzle 38 mounted in a first turbine case 39. This case 39 is connected to the bulkhead 34. The second or power turbine, including a rotor wheel 42, is mounted in a second or power turbine case 43 connected to the first turbine case 39. Power turbine wheel 42 is mounted on a shaft 44 which drives the power output shaft of the engine through a pinion 46 and a gear 47. Shafts 22 and 44 extend between the two matrices 33. The portion of each matrix to the rear of the bulkhead is housed in its individual exhaust collector 48.

Each side of the engine is closed by cover plates which provide for access to the matrix and flame tube on that side. A rear cover plate 49 is bolted to the margin of a large opening in the exhaust collector and to the side of the bulkhead. Means including a front cover plate 51 bolted to the sides of the bulkhead and compressor turbine housing close the forward side portion of the engine. A fuel nozzle 53 and an igniter (not illustrated) mounted on a combustion chamber cover project into the flame tube 36. Large openings 55 in the upper surface of the exhaust collectors provide for connection of exhaust pipes. The two flame tubes are connected by a crossover tube 57.

An inner inlet case 58 mounted on the forward frame comprises a front wall 59 which bridges the space between the two matrices ahead of the bulkhead and mounts rim seals for the inner rims of the matrices. The inner inlet case also includes a shaft housing shroud 61 which encloses the shaft housing 32.

The power turbine shaft 44 is supported by a rear frame or power turbine housing 63 which extends from top to bottom of the engine at the rear end thereof. The rear frame includes a power turbine shaft housing (not shown) around which is disposed an inner exhaust case or power turbine shaft housing shroud 64. This shroud is integral with a rear wall (not shown) which closes the rear part of the engine case between the exhaust collectors 48. Radiation shields 65 are mounted between the exhaust collectors 48 and the rear frame. The rear frame provides a support for a matrix drive shaft 66 and a matrix support shaft 67. These shafts extend parallel to the axis of the matrices. The matrix 33 may be identical or similar to that disclosed in application S.N. 559,389. It includes two rims 68 which are continuous rings and foraminous heat-transfer material 71 extending between the rings. Gears 72 on shaft 66 cooperate with ring gears on the rims 68 to rotate the matrices. Shaft 66 mounts a worm wheel 73 driven by a worm 74 connected to a drive shaft 76 which extends to the forward part of the engine where it is driven by a train of gears 77 from shaft 22 of the compressor turbine.

Shaft 76 is housed in an upper frame rail 78 which is integral with the bulkhead 34 and is bolted to the rear frame 63. A similar rail at the bottom of the engine (not shown) connects the bulkhead to the lower end of the rear frame. Main seals 81 are provided to seal the matrix at each point where it passes through the bulkhead. Seals 81 are located with respect to the matrix by rollers 82 and 83 engaging the outer rim 68 of the matrix and similar rollers engaging the inner rim. Springs 84 disposed between the main seal assembly and the front case or forward frame 26 bias the rollers into engagement with the rim and aid in the support and location of the matrix.

An accessory drive case 86 bolted to the upper rear part of the rear frame provides a mounting and drive gearing for various accessories driven by the compressor turbine through shaft 76. These accessories may include a starter 87 which has a relay 88, a tachometer 89, a fuel pump 91, and a fuel governor and control 92 regulated by an input or speed setting arm 93. The reduction gearing 46, 47 is housed in a case (not shown) fixed to the rear frame. Oil pan or sump 96 is fixed to the lower side of the engine. Engine supports (not shown) may be provided as desired.

In the light of the foregoing general presentation of the engine, and as an introduction to the detailed description, it may be desirable to point out briefly some of the significant features which distinguish it from the engine disclosed in the applications filed January 16, 1956.

An improved and simplified drive for the regenerator matrices and for accessory devices and the starter coupled to the compressor turbine are provided. A direct mechanical drive is used, and the accessories are moved from the front end of the engine to the rear, which is a preferred location.

The two drive pinions which cooperate with the ring gears on the two rims of each matrix are coupled to a driving shaft by a differential or self-aligning drive arrangement which not only eliminates alignment problems in manufacture, but also delivers equal torque to both rims of the matrix notwithstanding possible distortion from heating and cooling of the matrix.

Additional description of the engine in general, unnecessary to understanding the subject matter of this application, will be found in Patent No. 3,077,074.

The rear frame or power turbine housing 63 is a strong, rigid vertical box section member attached to the rear ends of the upper and lower frame rails. It includes a power turbine shaft housing (not shown) extending forwardly from the center of the frame which supports the power turbine shaft 44 and power turbine case 43. The rear frame mounts a ball bearing 192 which supports the forward end of shaft 193 in which the regenerator drive worm 74 is cut. Shaft 193 is coupled to the drive shaft 76 which extends through the upper frame rail. The shaft 193 is also supported by a bearing (not shown) in the accessory drive case 86 which bolts to the rear face of frame 63. The case 86 contains suitable gearing (not illustrated) by which the accessories are coupled to shaft 193 and thus to the compressor turbine.

Figure 3:
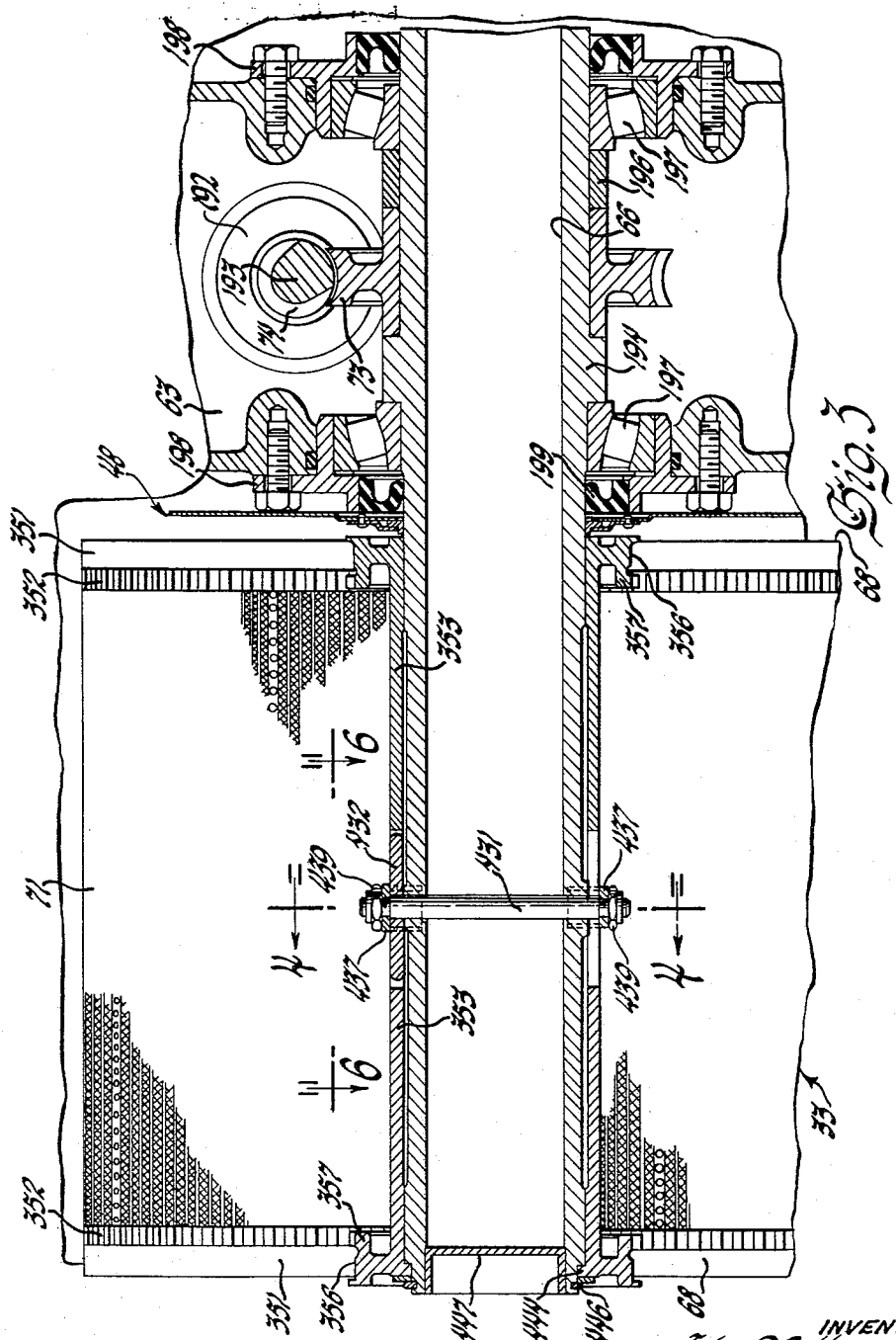
FIG. 3 is a partial transverse sectional view of the engine through the axis of the regenerator matrix drive shaft as indicated by the line 3—3 in FIG. 2.
Figure 4:
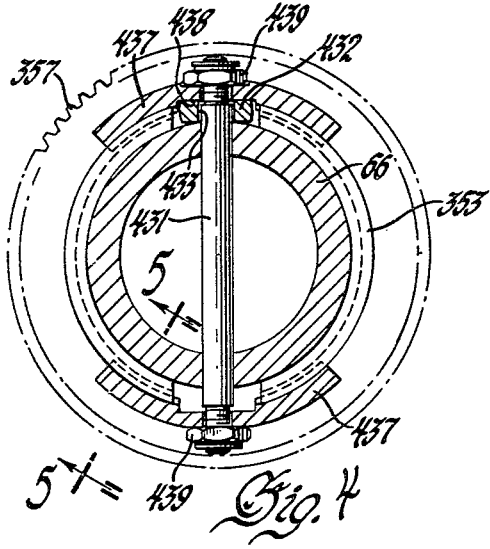
FIG. 4 is a transverse sectional view of the drive shaft taken on the plane indicated by the line 4—4 in FIG. 3.
Figure 5:
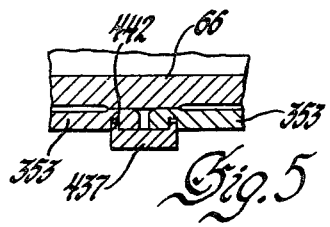
FIG. 5 is a fragmentary sectional view taken on the plane indicated by the line 5—5 in FIG. 4.
Figure 6:
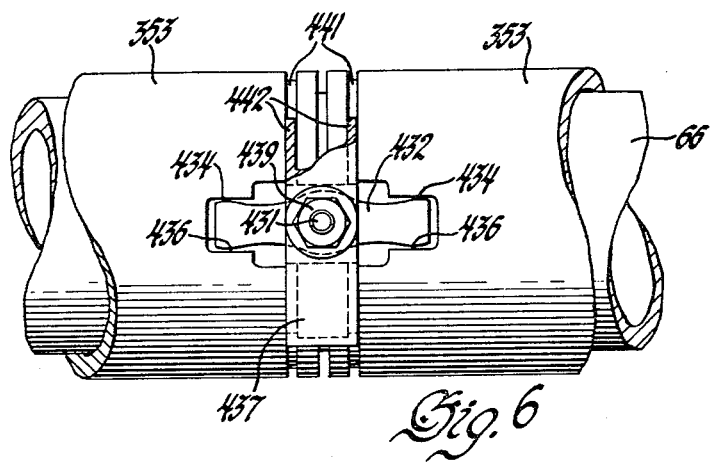
FIG. 6 is a plan view of the matrix drive shaft taken on the plane indicated by the line 6—6 in FIG. 3.

Referring to FIG. 3 for the support of the matrix drive shaft 66, worm wheel 73, which may be suitably keyed to shaft 66, abuts a shoulder 194 on the shaft and a spacer ring 196. The inner races of roller bearings 197 engage shoulder 194 and spacer 196 respectively. The outer races of bearings 197 are retained in cages 198 secured to the rear frame 63 by cap screws. Suitable oil seals 199 are mounted in the bearing cages. Bearings 197 provide the sole support for shaft 66, which has no outboard bearing. Matrix support shaft 67, which is an idler shaft, is mounted in the rear frame similarly to the shaft 66, the bearings and seals for this shaft being retained by cages.

*Regenerator Matrix Structure, Drive and Support*

The structure of the regenerator matrix, except insofar as it is adapted to cooperate with the other structures of the engine, is immaterial to the present invention. For the purpose of understanding the engine generally, the matrix is of drum configuration comprising outer and inner channel-section rings 68 defining the rims of the matrix, between which is fixed a ring of foraminous heat exchange material 71, the assembly making up a rigid regenerator drum 33. Each ring 68 has on its outer periphery a cylindrical track section 351 and a ring gear 352. The present matrix preferably differs from that described in Patent No. 2,973,010 in that the ring gear 352 is a separate ring which is shrunk onto the ring 68.

The matrix drive shaft 66 locates and drives the matrix through two sleeves 353 (indicated schematically by gears 72 in FIG. 1) mounted on the shaft and rotating therewith. Each sleeve has at one end thereof a flanged roller portion 356 cooperating with the track 68 and a pinion 357 cooperating with the ring gear 352. The sleeves 353 are a sliding fit onto the shaft; the means by which they are retained on and driven by the shaft will be described later.

The matrix support shaft 67 is mounted similarly to the shaft 66 in the rear frame 63, but is not provided with a driving gear or with pinions such as 357. A single sleeve 360 is mounted on each end of shaft 67. Sleeve 360 has an inner roller (not shown) which is flanged and an outer unflanged roller 362. The flange is omitted from this roller to facilitate installation of the matrix. The flange is provided after installation of the matrix by a ring 363 which engages the outer end of roller 362 and is retained by a contracting snap ring 364 lodged in a groove in the sleeve 360. The matrix is biased rearwardly against the rollers on shafts 66 and 67 which thus provide a location for the matrix as well as a drive to it. This rearward bias is provided principally by the gas pressures acting on the matrix when the engine is in operation.

The matrix is also biased rearwardly by springs 84 (FIGURES 1 and 2) which hold the matrix against the rollers at the rear when the engine is out of operation. Springs 84 are mounted between the rear flange of the front cover 26 and carriages 366 and 367 which mount rollers 82 and 83 which engage the track surface of the matrix. There are eight springs 84, two of them bearing against each carriage 366 or 367. These springs bear against ears on the carriages and are retained by plugs 368 threaded into tapped openings in bosses in the forward frame portion 26. As will be apparent, the springs and plugs may be inserted from outside the engine after the matrix has been installed in the engine. The carriages 366 and 367 serve to support the matrix, but their principal function is to support and locate the primary seals which seal against gas leakage where each matrix passes through the bulkhead. The primary seals 370 are floatingly mounted with respect to the bulkhead 34 and have secondary seals (not shown) between the primary seals and the bulkhead. The primary and secondary seals constitute a main seal 81 (FIGURE 1). Exact alignment of the primary seals with the matrix is attained by mounting them on the carriages 366 and 367 which track on the matrix.

The structure of the main seals is not described herein in the interest of conciseness, since the details are not material to this invention. The structure may be as described in Patent No. 3,057,604, previously referred to.

The matrices pass through slots in the bulkhead which are open at the outer ends to permit installation of the matrix and main seals and are closed by plates 384 after the matrix with the main seals (primary and secondary seal assemblies) on it has been installed in the bulkhead. Plates 384 are fixed to the bulkhead and also are fixed to the cover plates 49 and 51 which bolt over them. The forward portion 386 of each plate 384 is depressed below the outer surface of the main body of plate 384 so that it is spaced from the cover plate 51. A radial slot 387 in this portion of plate 384 receives a trunnion 388 extending from the body of the primary seal. The trunnion locates the seal and holds it against movement circumferentially of the matrix. Because of the radial extent of the slot, the primary seal may move radially inward and outward as the radius of the matrix changes with respect to the fixed structure because of thermal expansion. This movement is accommodated by the springs 84 and the rollers 82, 83 engaging the track on the matrix which maintain proper alignment of the primary seals with the matrix.

We may now consider the differential drive to the matrix driving pinions 357 from matrix drive shaft 66. As previously stated, the pinions 357 are mounted on sleeves 353 which are a slip fit on shaft 66 and may rotate slightly with respect to the shaft. The shaft drives these sleeves through a differential mechanism which allows either sleeve to move ahead slightly with respect to the other and provides an even distribution of load between the pinions 357 and proper tooth contact between the pinions and the gears 352 on the matrix. This not only compensates for and eliminates problems in alignment of the pinions in installation but it also compensates for any warping of the matrix which might move one gear 352 slightly out of step with the other. With the construction according to this invention, it is not necessary to attempt to align exactly the teeth of the two ring gears 352 or align the teeth of the pinions 357. The structure is self-aligning.

A pivot or pivot pin 431 extends diametrically through the shaft between the ends of the sleeves and projects from the shaft, each end of the pivot being threaded. A rocker arm 432 is pivoted on the pin 431 by a hole 433 through the center of the rocker arm. The rocker arm has enlarged rounded ends 434 which extend into slots 436 cut through the adjacent ends of the sleeves 353. An arcuate retainer 437 lies over the rocker arm 432 and has a flat recess 438 in its inner surface against which the upper surface of rocker arm 432 may bear. A second retainer 437 is mounted over the other end of pivot 431 and the two retainers are held in place by nuts 439. The retainer serves not only to retain the rocker arm 432 but also to maintain the sleeves in position. Circumferential grooves 441 adjacent the ends of the sleeves receive inwardly directed flanges 442 on each of the retainers 437.

As will be apparent, when the shaft 66 is rotated and pinions 57 engage the gears on the matrix, if either gear set is out of driving contact the rocker arm 432 may rock slightly about its pivot 431. Since the two arms of the rocker arm are equal, equal torque will be transmitted to each sleeve, subject to any slight difference due to friction between the sleeves and the shaft 66.

Referring to FIGURE 3, the outer sleeve 353 has a flange 444 which abuts a shoulder on the outer end of shaft 66 and is retained by snap ring 446. This structure is a relic of a former construction, and is not necessary with the retainer installation 437. The outer ends of shaft 66 are closed by pressed-in plugs 447.

*Operation*

No doubt, the operation of the engine will be apparent to those skilled in the art, but a brief statement of the operation may be desirable. The first turbine drives the compressor which delivers compressed air through the regenerator to the combustion space between the regenerator and the bulkhead. Fuel is burned in the compressed air within the flame tubes and the resulting combustion products flow through the two turbines in series. The first turbine, combustion chamber, and compressor may be termed a gas generator turbine which supplies motive fluid under pressure to the second or power turbine. The power turbine provides the useful work output of the engine. The gas exhausted from the power turbine flows outwardly through the regenerator into the exhaust collector and the exhaust pipes.

The hot exhaust gases flowing through the portion of the regenerator back of the bulkhead heat the matrices, which are rotated slowly by the compressor turbine. The matrices give up heat to the air flowing from the compressor to the combustion apparatus. The engine is started by cranking the compressor and first turbine by the starter motor, injecting fuel, and energizing the igniter. It is stopped by cutting off the fuel.

The invention is not to be considered to be limited by the detailed description of the preferred embodiment thereof for the purpose of explaining the principles of the invention. Many modifications may be made by the exercise of skill in the art within the scope of the invention.

We claim:

1. A rotary regenerator comprising, in combination, a drum matrix having two driving gears thereon near the edges of the matrix, and means supporting and guiding the matrix for rotation about its axis, the said means comprising a drive shaft parallel to the matrix axis, two sleeves on the shaft journalled thereon so as to allow limited rotation of the sleeves relative to the shaft, a pinion on each sleeve, each pinion meshing with one of the driving gears, and each sleeve having an axially extending slot in one end thereof, the two slots being in adjacent ends of the sleeves, a diametral pivot extending from the shaft, a rocker arm journalled on the pivot extending into the slots and engaging the sleeves to transmit torque to the sleeves from the shaft, and a retainer mounted on the pivot over the rocker arm having inwardly directed flanges, the sleeves having grooves receiving the flanges to locate the sleeves axially of the shaft.

2. The combination of a drive shaft, two sleeves on the shaft journalled thereon so as to allow limited rotation of the sleeves relative to the shaft, a pinion on each sleeve, and differential means drivingly coupling the drive shaft to the sleeves, each sleeve having an axially extending slot in one end thereof, the two slots being in adjacent ends of the sleeves, a diametral pivot extending from the shaft, a rocker arm journalled on the pivot extending into the slots and engaging the sleeves to transmit torque to the sleeves from the shaft, and a retainer mounted on the pivot over the rocker arm having inwardly directed flanges, the sleeves having grooves receiving the flanges to locate the sleeves axially of the shaft.

References Cited in the file of this patent

UNITED STATES PATENTS

| | | |
|---|---|---|
| 563,191 | DeLaval | June 30, 1896 |
| 856,943 | Church et al. | June 11, 1907 |
| 1,078,837 | Curtis | Nov. 18, 1913 |
| 1,624,416 | MacFarland | Apr. 12, 1927 |
| 2,932,381 | Kinnicutt et al. | Apr. 12, 1960 |

FOREIGN PATENTS

| | | |
|---|---|---|
| 30,446 | Germany | Aug. 29, 1884 |